Figure 1:
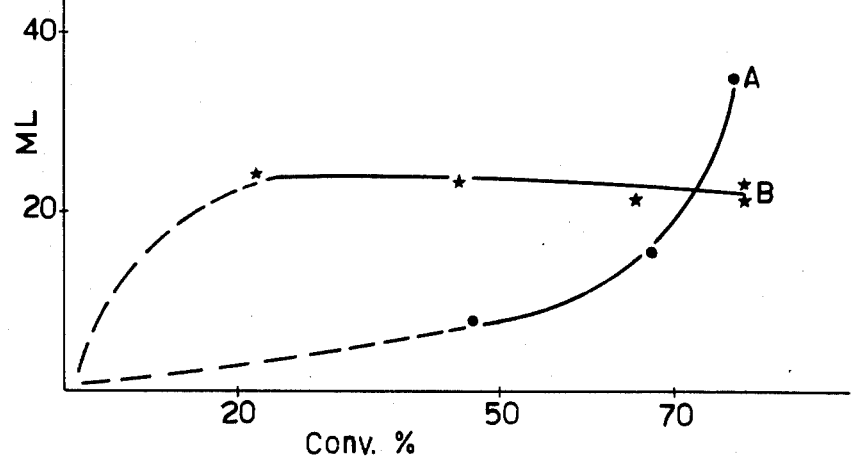

United States Patent [19]

Gordini et al.

[11] Patent Number: 4,699,960
[45] Date of Patent: Oct. 13, 1987

[54] PROCESS FOR THE POLYMERIZATION OR COPOLYMERIZATION OF BUTADIENE

[75] Inventors: Silvano Gordini, San Donato Milanese; Antonio Carbonaro, Milan; Stanislao Spina, San Donato Milanese, all of Italy

[73] Assignee: Enichem Elastomeri, S.p.A., Palermo, Italy

[21] Appl. No.: 878,036

[22] Filed: Jun. 24, 1986

[30] Foreign Application Priority Data
Jul. 1, 1985 [IT] Italy .................. 21377 A/85

[51] Int. Cl.$^4$ ...................... C08F 4/52; C08F 36/06
[52] U.S. Cl. ........................................ 526/81; 526/79; 526/86; 526/92; 526/137; 526/138; 526/142; 526/162; 526/164; 526/335; 526/337
[58] Field of Search ................ 526/86, 142, 164, 337, 526/340.4, 98, 79, 81, 335, 92, 137, 138, 142, 162

[56] References Cited
U.S. PATENT DOCUMENTS
4,429,089  1/1984  Pedretti et al. ............. 526/337 X
4,461,883  7/1984  Takeuchi et al. ........... 526/340.4 X FOREIGN PATENT DOCUMENTS
0127236  12/1984  European Pat. Off. ........... 526/84
0950221  2/1964  United Kingdom ............... 526/86

Primary Examiner—Joseph L. Schofer
Assistant Examiner—F. M. Teskin
Attorney, Agent, or Firm—Hedman, Gibson, Costigan & Hoare

[57] ABSTRACT

The present invention relates to the production of 1,4-cis-polybutadiene and of copolymers of butadiene with other conjugated diolefins, by means of the catalytic polymerization or copolymerization of monomer butadiene, by an either continuous or batch process, operating in the presence or in the absence of diluents, and carrying out a portionwise addition, during the polymerization, of a portion of the organometallic compound of aluminum (or of the related hydride derivative), constituiting also one of catalytic components.

6 Claims, 2 Drawing Figures

PROCESS FOR THE POLYMERIZATION OR COPOLYMERIZATION OF BUTADIENE

The present invention relates to the production of polymers and copolymers of conjugated diolefins with 1,4-cis structure, by means of the catalytic polymerization of monomer butadiene, by means of an either continuous or batch process, operating either in the presence or in the absence of diluents, and carrying out a portionwise addition, during the course of the polymerization, of the organometallic component of the catalyst.

In the art various catalytic processes are known for the polymerization of butadiene, suitable to produce polybutadiene with high content of 1,4-cis units, particularly suitable in the manufacturing of tyres and other elastomeric articles. The catalysts generally used to that purpose derive from the combination of compounds of transition metals, such as titanium, cobalt, nickel, uranium and rare-earth metals, with alkyl and/or hydride derivatives of metals of IA, IIA and IIIA Groups of the Periodic System, such as disclosed, e.g., in U.S. Pat. Nos. 3,118,864; 3,178,402; 3,794,604 and 4,242,232; and in Belgian Pat. Nos. 559,676; 573,680 and 791,709.

According to such processes, the polymerization of butadiene is mainly conducted in solution or anyway in the presence of hydrocarbon diluents.

Also processes are known for the production of 1,4-cis polybutadiene by mass polymerization, i.e., polymerization in the absence or in the substantial absence of said diluents.

U.S. Pat. No. 3,770,710 relates in fact to a process for the mass polymerization of diolephinic monomers with lithium catalysts by operating in a conventional reactor, in two steps at different temperatures, and evaporating the monomer to control the temperature.

The operation by controlled steps derives exclusively from the need of avoiding or at least minimizing the phenomena related to the foam and of completing the polymerization at higher temperature.

We are moreover acquainted with the patent application Ser. No. 612,800 filed on May 22, 1984 relating to a process for the catalytic polymerization of butadiene to 1,4-cis polybutadiene, carried out in the absence, or in the substantial absence, of solvents or diluents.

According to said process, a catalytic mixture is prepared by placing in contact, in a hydrocarbon carrier, one or more compounds of neodymium, one or more halogen supplying compounds, one or more hydroxy containing compounds and an organometallic and/or hydride compound of aluminium. Such catalytic mixture is placed in contact with liquid monomer butadiene, and the resulting mixture is continuously supplied to one end of an extended polymerization reactor of the "plug-flow" type, in which the polymerization of butadiene takes place. As an alternative, to said polymerization reactor a stream of the catalytic mixture and a stream of liquid butadiene is continuously fed.

The polymerization heat is removed by partial evaporation of monomer butadiene, so that, by controlling the pressure of this latter, maintaining the polymerization temperature within the prefixed range results possible. Furthermore, by controlling the composition of the catalyst, the butadiene/catalyst ratio, the polymerization temperature and the residence time inside the reactor, it results possible to produce mixtures containing from about 25 to about 90% by weight of polymer, which are continuously discharged from the other end of polymerization reactor.

From the discharged mixture, 1,4-cis polybutadiene is recovered, as the end product, by evaporating unreacted butadiene and the solvent possibly used as the carrier for the catalyst, from the polymeric mass to which a short-stopper for the catalyst and stabilizers against thermo-oxidative breakdown have been added.

Such evaporation takes place in a solvent-remover-extruder. However, by operating in continuous according to such process, with an inlet temperature not lower than 30° C., generally a 1,4-cis polybutadiene is obtained, the value of Mooney Viscosity (ML) of which is not constant, because of an insufficient homogenizing of the system constituted by the catalyst, the monomer and the polymer.

Also by operating by the processes in solution as hereinabove mentioned, a product is obtained, the average molecular weight of which varies often considerably with varying conversion.

We have now found that overcoming the above mentioned drawback is possible, hence obtaining a 1,4-cis polybutadiene with rigorously controlled molecular weight, thus avoiding oscillations of the related values of Mooney viscosity.

Further advantages of the invention are hereunder listed.

It is hence the purpose of the present invention a process which, by means of the combination of a suitable catalytic system and of an adequate polymerization process, allows the above said difficulties to be overcome and allows obtaining, with high yield, straight-chain and gel-free 1,4-cis polybutadiene, with high and rigorously controlled molecular weight, by operating either in continuous or batchwise, in the presence or in the absence of diluents, by effecting a portionwise addition of the organometallic component of the catalyst during the progress of the polymerization.

It is hence the object of the present invention a process for the preparation of polymers or of copolymers of butadiene with high content in 1,4-cis units, using a catalytic system constituted by:

(a) at least a compound of a metal of III B Group of the Periodic System, having an atomic number comprised within the range of from 21 to 103;

(b) at least a halogenated compound, selected from secondary and tertiary alkyl halides, aryl halides or alkylaryl halides, halides of organic acids, metal or organometallic halides, hydrogen halides and halogens;

(c) at least an organometallic compound not containing halide ions, of formula

wherein $R^a$ and $R^b$, equal to or different from each other are a saturated or unsaturated hydrocarbon radical, and $R^c$ is hydrogen or a hydrocarbon radical equal to or different from $R^a$ and $R^b$;

(d) at least an organic compound containing hydroxy or carboxy groups, characterized in that a portionwise addition is effected during the progress of the polymerization of a portion of c component.

The polymerization is initially carried out with an aluminium/metal of Group III B ratio, by gram-atoms, comprised within the range of from 10/1 to 30/1, and additions are effected of the Al compound to arrive to an end ratio comprised within the range of from 20/1 to 80/1, with the modalities and within the times as hereunder defined.

The c component is partly mixed with the other catalytic components and partly subsequently added to the mixture during the progress of polymerization, either in a pure state or in diluted state, in case using a diluent is desired.

The times and modalities of the addition of the aliquot of Al compound to be added portionwise are related to the duration of polimerization, and to the starting and end conditions; they depend also on the adopted process type.

The conditions preferred are those under which the addition is carried out in a continuous way, matching with the kinetic profile of the reaction. To practical purposes, it is however enough to add the aliquot of c component continuously, or as one or more spots during the time interval constituting at least 50% and the central part of the total reaction time.

So, e.g., if said aliquot represents a fairly high portion (e.g., 50%) of all c component used, in a polymerization taking a total of 2 hours, the portionwise addition shall take place starting from about the 30th till to the 90th minute from the beginning of the reaction. In case of a lower aliquot, this latter can be introduced as three, two spots, or even as one spot only, in the nearby of the central reaction time.

As the (a) metal derivative, any compound described in the technical literature, either of organic or inorganic nature, can be used.

Among all of them, the Applicant has observed particular advantages when neodymium compounds, such as the oxide, the alkoxides and the carboxylates, are used, which, accordingly to the foregoing, can be used both in the pure state, and in association with other derivatives of other metals selected among those above defined, e.g., praseodymium and lanthanum.

The c component of the catalytic system is constituted by one or more organometallic compounds not containing halide ions, of formula

$R^a R^b ALR^c$ wherein $R^a$ and $R^b$, equal to or different from each other, are a saturated or unsaturated hydrocarbon residue, preferably a straight or branched alkyl residue, containing from 1 to 18 carbon atoms, and $R^c$ is hydrogen or an alkyl radical equal to or different from $R^a$ and $R^b$. For instance, Al-triisobutyl, Al-triethyl, Al-diisobutyl hydride are efficaciously used.

The d component of the catalytic system is selected among alcohols, phenols and carboxy acids, with the possible addition of water. Among these, the preferred compounds are butanol, 2-ethylhexanoic acid, the naphthenic acids, versatic acids, which can be used either in free form, or in form partly or totally combined with the (a) component.

Water, as well as the other compounds belonging to d component, acts as activator, and the amount thereof can be indicated in a ratio of from 0.01/1 to 1/1 to the aluminium c compound.

Monomer capable of polymerizing by the process herein disclosed are all conjugated diolephins, and in particular 1,3-butadiene, 1,3-pentadiene, isoprene.

The copolymers result interesting of two or more of the said monomers, due to their microstructure, essentially all of 1,4-cis type, and for the random distribution of the monomeric units, in particular those between butadiene and isoprene and between butadiene and piperylene, whose crystallization temperatures are controlled by the compositions.

The advantages of the present invention are mainly: that of using an Al-alkyl compounds separately as a catalytic component and as transfer agent, and that of rendering the average molecular weight of the (co)-polymer, and hence its Mooney (ML) viscosity independent from conversion, that deriving from a saving of the same (c) component, which is performed with the end result, in terms of conversion and of ML, remaining the same.

In order to better illustrate these concepts, reference is made to FIG. 1 (referred to the results of Examples 1–9), wherein in abscissa the % conversion and in ordinate the Mooney (ML) viscosity is reported.

The curve A is obtained from the tests of Examples from 6 to 9, and constitutes the ML/conversion relationship according to the prior art. The curve B is obtained from the tests of Examples from 1 to 4, and represents the result according to the invention, wherein ML remains substantially unchanged for a conversion of from about 20 to about 80%.

The advantage of the trend according to B over A results evident, both because of the constancy of ML with varying conversion (in the opposite case a desired value of ML results difficultly accomplishable), and for the lower end value of ML with the same composition (which leads to a saving of c component, acting as molecular weight regulating agent, besides as essential catalytic component).

In case the polymerization is carried out by a process of mass polymerization, the present invention is preferably practically embodied according to the following outline.

A catalytic mixture is prepared by placing in contact the individual components, preferably in the presence of a small amount of monomer(s) to be polymerized:
(a) At least a neodymium compound selected from neodymium oxide, alkoxides, phenates and carboxylates, or mixtures thereof with other components of rare-earth elements;
(b) At least one organic compound containing hydroxy (alcoholic or phenolic) or carboxy groups, selected among alcohols, phenols and carboxy acids, with the possible addition of water:
(c) at least one aluminium organometallic compound, or the related hydride derivatives;
(d) at least a halogenated compound, selected among secondary or tertiary alkyl halides, aryl or alkylaryl halides, halides of organic acids, metal or organometallic halides, hydrogen halides and halogens;
wherein the a and b components are pre-reacted, possibly in the presence of d component, and wherein the initial amounts of the components are such as to comply with the following ratios to each other: between hydroxy groups (b component) and transition metal (a component), of from 2:1 to 80:1; between c and a, of from 10:1 to 80:1; and between d and a, of from 0.1:1 to 4:1.

Said catalytic mixture and liquid monomer butadiene, possibly pre-mixed, are fed, in amounts of from $10^4$ to $4.10^5$ g.moles of butadiene per each g.atom of neodymium, either batchwise, to a stirred polymerization reactor, or continuously to an end of an extended reactor, in which the polymerization is carried out of the mixture flowing in plug-flow mode, the temperature being controlled by means of the partial evaporation of monomer butadiene from the liquid polymerization phase, under constant pressure, up to obtain a mixture with a content of polymer of about from 25 to 90% by weight.

A portion of organometallic c component is fed along the extended body of the reactor;

1,4-cis polybutadiene is separated and recovered from said mixture discharged from the reactor.

In any case, the polymerization can be carried out in continuous in an equipment of the type of self-cleaning single-screw or twin-screw extruder, with a one-step process, maintaining an inlet temperature not lower than 30° C. and an outlet temperature not higher than 130° C., and preferably within the range of from 50° to 100° C.

As an alternative, it can be carried out in continuous in more subsequent steps, using reactors of the type of self-cleaning single-screw or twin-screw reactors, or batchwise in a stirred reactor.

The carrier used for the catalyst according to the process in mass can be constituted by inert (non reactive) low-boiling or relatively low-boiling alicyclic, cyclic or branched hydrocarbons, such as butane, pentane, hexane, cyclohexane and heptane or mixtures thereof. These hydrocarbons introduced together with the catalyst in small amount, also decidedly lower than 5% by weight of produced polymer, are separated from polybutadiene at the end of polymerization, e.g., in a suitable solvent-remover extruder.

According to another form of embodiment, the carrier for the catalyst is constituted by hydrocarbons or hydrocarbon mixtures, of high molecular weight, such as paraffin oil and the like, or hydrocarbon oils required for formulations of oleo-extended polybutadienes.

These hydrocarbons need not to be separated and remain incorporated in polybutadiene. In particular, it has been found that when the content of paraffin oil and the like is lower than about 5% by weight relatively to the polymer, the characteristics of this latter are not modified to an appreciable extent.

According to a form of continuous embodiment of the mass process, into a polymerization reactor a stream of catalytic mixture and a stream of liquid butadiene are independently fed, according to ratios of from $10^4$ to $4.10^5$ g.moles of butadiene per each gram.atom of Nd.

The pressures under which the polymerization is carried out are the equilibrium pressures at the selected temperature. For the above indicated temperature range, said pressure values are conveniently selected within the range of from 3 to 18 absolute bars. By operating within the range of general conditions as previously disclosed, from the reactor a mixture is discharged with a polymer content of from 25 to 90% by weight, by operating with residence times of from 10 to 120 minutes. Under the preferred operating conditions, the residence times are of the order of 10–30 minutes. Due to economical reasons, operating is convenient with relatively high values of butadiene conversion into the related polymer, discharging from the reactor mixtures with a polymer content of 60–90% by weight.

According to a form of embodiment of the present invention, the mixture outcoming from the polymerization reactor is sent to a mixing device, wherein the polymerization stopping agents (short-stoppers) and the stabilizers against the thermo-oxidative degradation of the polymer are fed, preferably as a solution in butadiene. To deactivate the catalyst, water or organic acids, such as the resinic acids, or higher aliphatic alcohols (containing, e.g., from 8 to 18 carbon atoms in their molecule) or their combinations are preferably used, also with sequential treatments, in such amounts as to globally exceed the sum of the catalytic components by at least 5–10 times by mol.

To the short-stopper different from acids, alkalifying agents soluble in it, such as ammonia, amines, epoxides and organic salts (alcoxides and carboxylates) of alkaline metals are preferably added.

To the hydrocarbon solution, besides the usual antioxidizer compounds useful for the preservation of the polymer, such as the sterically hindered phenols and phosphites, radical catching compounds, such as secondary amines and the same epoxides, are preferably added. The two solutions can be conveniently emulsified with each other.

The so-treated mass can be sent to a further heated screw device (solvent-remover extruder), wherein the volatile substances are evaporated off, by operating at temperatures comprised within the range of from 100° to 180° C. and under a pressure equal to or close to the atmospheric pressure.

By this treatment, the unreacted butadiene, the possible low-boiling solvent introduced together with the catalytic mixture, as well as the water possibly fed in excess over that required for the destruction of the catalytic system are removed. Butadiene and possible low-boiling solvent undergo the usual processings for their separation and recycle.

Such polybutadiene shows a content of 1,4-cis units generally higher than 97%, and a Mooney viscosity (M.L. 1+4, 100° C.). of from 30 to more than 80.

So, by means of the process according to the present invention, achieving is possible a straight, gel-free polybutadiene with a very high content in 1,4-cis units. Said polymer does not require any washing treatments for the separation of the catalyst residues.

Furthermore, the mass process here disclosed is simple and convenient, it requires low energy consumptions and does not show problems of environmental character, due to the elimination of the wastes, and can also be advantageously used for the copolymerization of butadiene with other conjugated diolefins, such as, e.g., isoprene and piperylene, copolymers with essentially 1,4-cis structure being obtained.

In the embodiments in solution of the present process, the polymerization reaction is carried out in the presence of solvents inert towards the catalyst, which are the same as previously indicated as diluents for the catalyst.

Also the polymerization temperature is comprised within the above indicated range of from 30 to 130° C., and preferably of from 50° to 100° C.

The reaction times are in this case longer than those of the mass process and range from about 20 minutes up to some hours.

The process in solution can be accomplished both in continuous and batchwise, using reactors of the homogeneous type or of plug-flow type, a product having the above disclosed characteristics, i.e., polymers and copolymers with straight structure with linkage of essentially 1,4-cis type being always obtained.

All operational details shall be evident from the reading of the following Examples, having the only purpose of illustrating the invention without limiting the purposes thereof.

EXAMPLES 1–9

Preparation of the catalyst

In a glass bottle with heavy walls, of about 100 ml of capacity, a magnetic anchor is introduced, then in the order:

| | |
|---|---|
| naphthenic acids (acidity number, A.N. 200) | 19.8 g |
| Neodymium oxide ($Nd_2O_3$, 95%) | 4.04 g |
| Tert. butyl chloride (t. BuCl) | 4.25 ml |
| Vaseline oil (viscosity: 205.6 cst at 20°, and 38.86 cst at 50° C. | 45 ml | are charged.

The bottle is capped with a crown cap provided with a bore and neoprene gasket, and is placed in a temperature-controlled bath kept at 80° C. The anchor is kept vigorously whirled by means of a rotary magnet. After 5 minutes, by means of a microsyringe, 80 μl of aqueous HCl (at 37% by weight) are introduced. The reaction at 80° C. is continued over a total of 2 hours. The content of the bottle is then slowly transferred into a 1 l flask containing, under a $N_2$ atmosphere, a 1.1 molar solution of $(i.C_4H_9)_2AlH$ (371 ml).

The addition is carried out under stirring and at room temperature.

Twentyfour hours after the preparation, the catalytic solution so obtained is analytically titrated, showing the following molarities (g.atoms/l):
Nd 0.0520
Al 0.9357
Cl 0.0806

Polymerization of butadiene in hexane solution

Eight identical reactors with glass body and head of stainless steel equipped with valves are used.

Into each reactor 360 ml of hexane and 80 g of butadiene are charged under a $N_2$ atmosphere.

In all tests an equal amount (1.0 ml) has been used of the catalyst prepared as hereinabove disclosed, but in some of them additional $(i.C_4H_9)_2AlH$ has been added, in the amounts and at the times as shown in the following Table (the time t is measured from the introduction of the catalyst).

Also the duration of the individual tests (t') has been varied as shown, however maintaining a comparison criterion between the two 1–4 and 6–9 series.

TABLE

| Test No. | $(i.C_4H_9)_2AlH$ added mmoles | t, min | End Al/Nd | Polymerization | Conversion % | ML (1 + 4, 100° C.) |
|---|---|---|---|---|---|---|
| 1 | — | — | 18 | 30 | 22.0 | 24 |
| 2 | 0.0312 | 30 | 24 | 60 | 45.5 | 23 |
| 3 | 0.0624 | 60 | 30 | 90 | 65.7 | 21 |
| 4 | 0.0936 | 90 | 36 | 120 | 78.2 | 23 |
| 5 | — | — | 18 | 120 | 67.5 | 71 |
| 6 | 0.0936 | 0 | 36 | 30 | 23.7 | <5 |
| 7 | 0.0936 | 0 | 36 | 60 | 47.0 | 8 |
| 8 | 0.0936 | 0 | 36 | 90 | 67.5 | 15 |
| 9 | 0.0936 | 0 | 36 | 120 | 76.9 | 34 |

The polymerizations have been stopped at the times shown by means of the indroduction of 2 ml of ethanol diluted in 10 ml of hexane containing 1 g of dissolved antioxidizer AO 2246.

The polymer has been recovered from the solution by coagulating in an excess of ethanol, and drying the solid in vacuo at 40° C. The conversions and Mooney viscosities of the products obtained are reported in the Table. It results from them how the portionwise addition of a portion of $(i.C_4H_9)_2AlH$ during the progress of the batch polymerization leads to Mooney values nearly constant with varying conversions (the range covered is of from 22 to 78%: tests 1–4) and lower than those which can be obtained with the same amount of Al-alkyl used in the same reaction time, but introducing the aluminium compound all together at the beginning (see tests 4 and 9).

EXAMPLES 10–12

The catalyst is prepared in a way similar to the disclosure reported in Example 1, with the only variant of the amounts of t.BuCl and of $(i.C_4H_9)_2AlH$ used in the reaction, which are, respectively: 5.6 ml (instead of 4.25) and 412 ml of 1.1 molar solution in vaseline oil (instead of 371). The new solution gives the following analysis:
Nd 0.0474 g.atoms/l
Al 0.9480 g.atoms/l
Cl 0.0962 g.atoms/l Tests of mass polymerization of butadiene are sequentially carried out in a stainless steel reactor of 2 l of capacity, provided with mechanical stirrer and with system for the outer condensation and the recycle of the monomer evaporated during the constant-pressure reaction.

Into the reactor under a nitrogen atmosphere 500 g of butadiene, and after having isothermed at 60° C., 8.4 ml of the above disclosed catalytic solution (equivalent to 0.4 mmol of Nd) are charged, in addition to $(i.C_4H_9)_2AlH$ in the amounts and at the times (t) as shown in the following Table:

TABLE

| Test No. | $(i.C_4H_9)_2AlH$ added mmoles | t, min | End Al/Nd | Conversion % | ML (1 + 4, 100° C.) |
|---|---|---|---|---|---|
| 1 | 2.0 | 0 | 25 | 65.0 | 42 |
| 2 | 2.0 | 4 | 25 | 64.0 | 40.5 |
| 3 | 1.0 + 1.0 | 4 + 4 | 25 | 67.5 | 37 |

All the three tests are interrupted after 20 minutes from the introduction of the catalyst, making residual butadiene rapidly evaporate. During the polymerization the pressure is kept at 6.7 bars and the vapours formed are condensed and recycled to the reaction.

The solid product obtained in plunged and crumbled in an excess of ethanol containing 1% of AO 2246 to the only purpose of neutralizing the still active catalyst, and is then dried in vacuo and weighed.

The recorded conversions and Mooney viscosities are reported in the Table. The polymers result free from gel and with a cis titre comprised within the range of from 97.6 to 97.8%.

The comparison of ML values shows the better effect of regulation of molecular weights accomplished with the delayed addition of a portion of Al-alkyl catalytic component.

EXAMPLE 13

(A) Continuous reference polymerization

Figure 2:
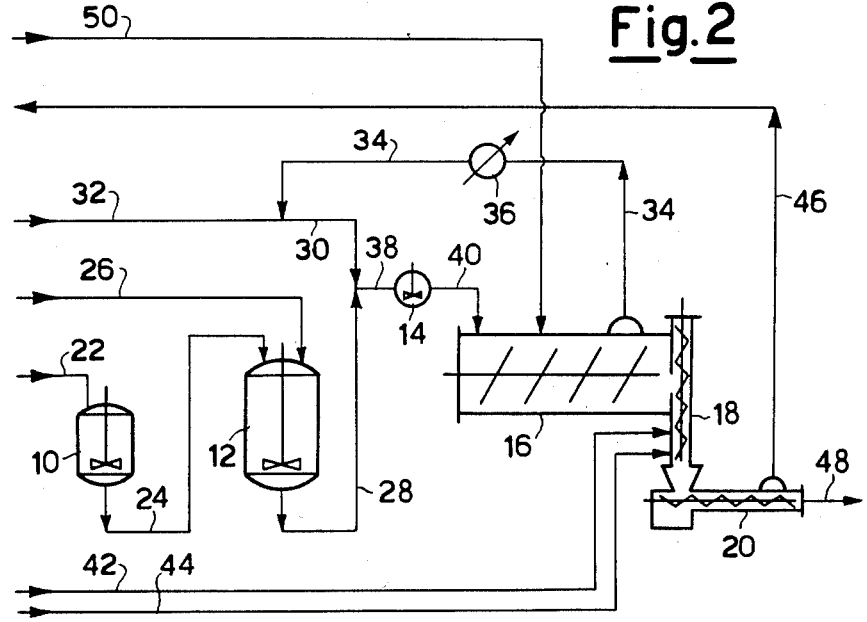

Into the vessel (10) with 5 l capacity (see attached FIG. 2), provided with stirrer and heat exchange system, under nitrogen atmosphere, through the line (22):
220 g (0.62 mol) of neodymium oxide ($Nd_2O_3$) at 95%;

945 g (3.9 mol) of naphthenic acid, with acidity number 230;
180 g (1.9 mol) of tert.butyl chloride at 98%;
2.8 kg of vaseline oil;
10 ml of aqueous solution of HCl at 37% by weight, are charged.

The mixture is kept stirred inside the vessel (10), under nitrogen atmosphere, at the temperature of 60° C., for 3 hours. At the end of this time period, a mixture having the appearance of an oil is obtained. The so obtained mixture is charged, by the line (24), into the vessel (12), of 120 l of capacity, provided with stirrer. Into the vessel (12), through the line (26), also 50 l are charged of a solution containing 0.8 mol/l of aluminium diisobutyl monohydride in vaseline oil.

The mass is kept stirred under nitrogen at room temperature (about 20° C.), for 2 hours.

At the end of this time period, a catalytic solution is obtained having the following concentrations, referred to neodymium, aluminium and chlorine:
neodymium: 0.023 g.atoms/l
aluminium: 0.74 g.atoms/l
chlorine: 0.034 g.atoms/l.

So, the chlorine/neodymium ratio results equal to about 1.5/1, and the aluminium/neodymium ratio results equal to about 32/1 by g.atoms.

The catalytic solution is drawn from the vessel (12), by the line (28), at the flow rate of 330 ml/hour and is mixed with liquid and anhydrous butadiene, outcoming from the line (30), at the flow rate of 36 l/hour.

Said butadiene outcomes partly from the fresh butadiene drying section (not shown) through the line (32) (about 14 l/hour), and partly from the recycle from reactor (16), through the line (34) (about 22 l/hour), after prior condensation in (36).

Butadiene and the catalytic solution are conveyed through the line (38) to the mixer (14), provided with stirrer, of 1.5 l of capacity. The mixing temperature is of about 30° C.

The mixture leaving the mixer (14) is supplied through the line (40) to the polymerization reactor (16). The reactor (16) is a self-cleaning screw-type reactor, with a total volume of 23 l and with a useful volume of 16 l, into which the polymerization mixture flows with a movement of plug-flow type. The operational conditions inside reactor (16) are: pressure 6.7 bar, inlet temperature about 60° C., and outlet temperature about 90° C.

The polymerization heat is removed by partial evaporation of butadiene, which is drawn through the line (34) and recycled, after preliminary condensation in condenser (36).

Under these conditions, from reactor (16) a mixture containing about 70% by weight of polymer is discharged, and is supplied to the screw device (18), to which water is fed by the line (42), at the rate of 150 ml/hour. In a more downstream point of device (18), by the line (44) and at the flow rate of 300 ml/h a solution containing 100 g/l of a conventional antioxidizer in vaseline oil is supplied.

The so-treated mass is conveyed, for the elimination of volatile components, to the device (20), wherein, at the temperature of 130° C. and under the atmospheric pressure, residual butadiene and water, which are sent to the reaction for butadiene recovery (not shown) through the line (46), are removed.

From device (20), through the line (48) about 6 kg/h are recovered of polybutadiene having average Mooney viscosity of 40. The instantaneous values of Mooney viscosity are variable, and comprised within a range of +15 points.

(B) Continuous polymerization according to the invention

By the procedure as disclosed under part (A), a catalytic solution having the following concentrations:
neodymium 0.023 g.atoms/l
aluminium 0.57 g.atoms/l
chlorine 0.034 g.atoms/l
is prepared.

The atomic chlorine/neodymium results hence of about 1.5/1, and aluminium/neodymium ratio of about 25/1.

By operating in a way similar to previous part (A), to the mixer (14) 330 ml/h of the catalytic mixture and 36 l/h of anhydrous liquid butadiene are fed.

The operating conditions of the polymerization reactor (16) are the same as of part (A), but the fact that about to the central area of the reactor, through the line (50), 105 ml/h are fed of a solution containing 0.5 mol/l of aluminium diisobutyl monohydride in vaseline oil. By so doing, the Al/Nd ratio is increased from 25/1 to 32/1, by g.atoms.

The device (18) and the device (20) operate in a way similar as shown under part (A).

Through the line (48), about 6 kg/h of polybutadiene having an average Mooney viscosity of 37, with oscillations comprised within the range of ±2 points, are discharged.

EXAMPLE 14

A. Preparation of the catalyst

Into a glass bottle with heavy walls, of about 100 ml of capacity, a 12×55 mm teflon-coated magnetic anchor is introduced, then in the order:

| | |
|---|---|
| Naphthenic acids (acidity number = 200) | 19.8 g |
| $Nd_2O_3$ (95%) | 4.04 g |
| Tert. butyl chloride | 4.25 ml |
| Hexane | 45.0 ml | are charged.

The bottle is capped with a crown cap provided with a bore and tightly sealing neoprene gasket, and is transferred into a temperature-controlled bath kept at 80° C. The anchor is kept vigorously whirled by means of a rotary magnet. After 5 minutes, by means of a microsyringe, and through the rubber gasket, 0.08 ml of HCL in aqueous solution at 37% (Carlo Erba) are added.

After about 80 minutes, the colour of the suspension turns from grayish into nut-brown.

The reaction is continued at 80° C. over a total of 3 hours.

The resulting thick solution, titrated after 3 hours of rest at room temperature, supplies a Nd content of 0.343 mol/l.

It is slowly transferred, over a time of about 5 minutes, into a glass flask wherein 524 ml have already been prepared of 1.04 molar solution of $(i.Bu)_2AlH$ in hexane under mechanical stirring, priorily introduced into the flask under a dry $N_2$ atmosphere.

The so obtained solution is kept twentyfour hours at room temperature before being used. From the elemental analysis the following concentration result:
Nd 0.0393 g.atoms/l
Al 0.908 g.atoms/l Cl 0.058 g.atoms/l
Al/Nd 23 and Cl/Nd 1.5 (by g.atoms).

B. Polymerization of butadiene - Reference Tests

B1. Into a glass reactor having the shape of a long cup, with steel head provided with outlets with valve, of the capacity of about 700 ml, already before its sealing a teflon-coated magnetic anchor is introduced.

Into the sealed reactor and under a dry $N_2$ atmosphere, 360 ml (237.6 g) of anhydrous hexane are introduced by siphoning.

Into it 80 g butadiene and 1.33 ml of the previously prepared catalytic solution are then introduced. The reactor is immediately dipped in water thermostatic bath, already isothermed at the temperature of 60° C., and the magnetic anchor contained in it is made rapidly whirl by means of an outer rotary magnet.

The temperature of the reaction mass, thanks also to the polymerization heat, reaches rapidly 60° C. The reaction is continued for 120 minutes, and is then stopped by the introduction of 2 ml of ethyl alcohol diluted with 10 ml of hexane.

The polymeric product is recovered by pouring its solution into an excess (1.5 l) of ethanol containing about 250 mg of antioxidizer AO 2246. After drying, 46.6 g of polymer, corresponding to a conversion of 58.2%, are weighed.

The Mooney viscosity of the product has not resulted measurable at 100° C. in 1+4 min., it being probably higher than 100.

B2. Inside a reactor similar to that disclosed under B1 a polymerization test analogous to the foregoing is carried out, with the only exception of the addition of 1.15 ml of 1.04 molar solution of $(iBu)_2$ AlH, such as to double the amount of Al present in the catalyst (Al/Nd from 23 up to about 46, by g.atoms).

After 120 minutes of polymerization at 60° C., the following results are obtained: polymer: 56.6 g (conversion 70.75%) Mooney viscosity (1+4, 100° C.): 42.

C. Polymerization of butadiene according to the invention

Inside the same equipment as hereinabove disclosed for the reference B tests, a polymerization of butadiene analogous to the B1, i.e., by using monomer and catalyst in the same amounts and at the same temperature, is carried out, with the difference that during the progress of the reaction, three aliquots are added, of 0.38 ml each one, of 1.04 molar solution of $(iBu)_2$ AlH, after 30, 60 and 90 minutes, respectively, from the beginning of the test, such as to increase the Al/Nd ratio from its initial value of 23, up to 46.

By interrupting the test after 120 minutes, the following results are obtained:
dry polymer: 55 g (conversion 68.75%)
Mooney viscosity (1+4, 100° C.): 17.

EXAMPLE 15

A. Polymerization of butadiene according to the invention

A test of polymerization like that disclosed under C, Example 14, is carried out, with the difference that the aliquots of 1.04 M solutions of DIBAH introduced during the reaction time are of 0.2 ml each, and that the introduction times are the 20th, 40th and 60th minutes from the beginning. In this way, the initial Al/Nd ratio, which is 23, is increased up to about 38. After 120 minutes of polymerization, 50.5 g of dry product are obtained (conversion 63.1%), with Mooney viscosity (1+4, 100° C.) of 23.5.

B. Comparative polymerization

A test similar to the one just disclosed (see under A.), but wherein all Al-alkyl is introduced from the beginning, yields the following results: dry polybutadiene: 48.4 g (conversion 60.5%) ML 1+4, 100° C.): 40.

We claim:

1. A process for the preparation of homopolymers or copolymers having a high 1,4-cis content from butadiene and other conjugated diolefins using a catalytic system comprising:
    (a) at least one compound of a Group IIIB metal having an atomic number within the range of from 21 to 103;
    (b) at least one halogenated compound selected from secondary alkyl halides, tertiary alkyl halides, aryl halides, alkylaryl halides, halides of organic acids, metal halides, organometallic halides, hydrogen halides and halogens;
    (c) at least one non-halogenated organometallic compound having the formula $R^a R^b AlR^c$ wherein $R^a$ and $R^b$ are the same or different than each other and are selected from saturated and unsaturated hydrocarbon radicals having 1–18 carbon atoms, and $R^c$ is selected from hydrogen, saturated hydrocarbon radicals and unsaturated hydrocarbon radicals having 1–18 carbon atoms, which may be the same or different than $R^a$ and $R^b$;
    (d) at least one hydroxyl or carboxyl group containing organic compound or water;
said process comprising initiating the polymerization reaction with an aluminum/Group IIIB metal ratio of from 10/1 to 30/1 gram-atoms, and adding a portion of component (c) during the polymerization reaction.

2. The process of claim 1, further comprising adding component (c) during the polymerization reaction until the aluminum/Group IIIB metal ratio is within the range of from 20/1 to 80/1 gram-atoms.

3. The process of claim 1 wherein said portion of component (c) is added continuously during the polymerization reaction.

4. The process of claim 1 wherein said portion of component (c) is added sequentially during the polymerization reaction.

5. The process of claim 2 wherein the said portion of component (c) is added continuously during the polymerization reaction.

6. The process of claim 2 wherein said portion of component (c) is added sequentially during the polymerization reaction.

* * * * *